United States Patent [19]

Bankert et al.

[11] Patent Number: 5,724,271
[45] Date of Patent: Mar. 3, 1998

[54] MODEL-BASED METHOD FOR OPTIMIZED FIELD BALANCING OF ROTATING MACHINERY

[75] Inventors: Raymond John Bankert, Greenville, S.C.; Harindra Rajiyah, Clifton Park, N.Y.

[73] Assignee: General Electric Company, Schenectady, N.Y.

[21] Appl. No.: 571,791

[22] Filed: Dec. 13, 1995

Related U.S. Application Data

[63] Continuation-in-part of Ser. No. 217,825, Mar. 25, 1994, abandoned.

[51] Int. Cl.$^6$ .................................................. G01M 1/16
[52] U.S. Cl. ..................... 364/578; 364/463; 73/461; 73/462
[58] Field of Search .................... 364/512, 463, 364/508, 571.01, 571.02, 567, 566; 73/462, 461

[56] References Cited

U.S. PATENT DOCUMENTS

| | | | |
|---|---|---|---|
| 4,098,127 | 7/1978 | Shiga et al. | 73/462 |
| 4,891,981 | 1/1990 | Schonfeld | 73/460 |
| 5,172,325 | 12/1992 | Heidari | 364/463 |
| 5,237,505 | 8/1993 | Beebe | 364/463 |
| 5,412,583 | 5/1995 | Cameron et al. | 364/508 |

OTHER PUBLICATIONS

Thomas P. Goodman, "A Least–Squares Method for Computing Balance Corrections", Journal of Engineering for Industry, Aug. 1964, pp. 273–279.

M.S. Darlow, "The Identification and Elimination of Non–Independent Balance Planes in Influence Coefficient Balancing", ASME paper No. 82–GT–269, 1982.

Bruce D. Thompson et al., "Methods and Procedures for Trim Balancing The LM2500 Marine Gas Turbine The Test Cell And Aboard Ship", ASME Paper No. 89–GT–318, 1989.

"Automated Vibration Diagnostics for Large Steam Turbines", by R.J. Bankert, C.H. Gold & I. Imam, Expert System Application for the Electric Power Industry: International Conference and Exhibition, Phoenix, Arizona, Dec. 8–10, 1993.

"Multiple–Rotor Field Balancing Based On Design Influence Coeficients", R.J. Bankert et al., U.S. Patent Application Serial No. 07/718,697, filed Jun. 21, 1991.

"Model Based Diagnostics and Prognosis System for Rotating Machinery", by Raymond J. Bankert et al., International Gas Turbine and Aeroengine Congress & Exposition, Houston, Texas, Jun. 5–8, 1995.

*Primary Examiner*—Kevin J. Teska
*Assistant Examiner*—Matthew Loppnow
*Attorney, Agent, or Firm*—Douglas E. Erickson; Marvin Snyder

[57] ABSTRACT

A method for balancing a rotor of a rotatable machine such as a steam turbine-generator unit. A time-dependent equation is formulated for rotor vibration based on a rotordynamic computer model derived from finite element analysis of the machine's rotor vibration due to centrifugal forces caused by adding unbalance weights. The equation is repeatedly solved in the frequency domain as an optimizer program uses iteration to determine the unbalance weights which will cause the vibration of the rotor of the model to duplicate the measured vibration of the rotor of the machine. Then, balance weights are added to the rotor of the machine which are the inverse of the unbalance weights which were added to the rotor of the model.

3 Claims, 2 Drawing Sheets

MODEL-BASED METHOD FOR OPTIMIZED FIELD BALANCING OF ROTATING MACHINERY

CROSS-REFERENCE TO RELATED APPLICATIONS

The present patent application is a continuation-in-part application of U.S. patent application Ser. No. 08/217,825 by Raymond J. Bankert et al. which is entitled "Model-Based Method for Optimized Field Balancing of Rotating Machinery" and which was filed Mar. 25, 1994, now abandoned.

BACKGROUND OF THE INVENTION

The present invention relates generally to rotating machinery, and more particularly to a method for field balancing rotating machines.

Rotating machines include, but are not limited to, large turbine-generator units having gas or steam turbines which turn generators to product electric power. The high speed flexible rotor of a turbine-generator unit is defined to include the coupled and co-axially-aligned individual rotors of the unit's turbine and generator. The rotor of a turbine-generator unit is sometimes referred to as a multiple-rotor train.

Manufacturing tolerances typically cause a machine's rotor to have a mass unbalance about its longitudinal axis. Such mass unbalance will cause rotor vibrations leading to the eventual wearing out, or even sudden failure, of machine parts such as rotor shaft bearings. Replacement of vibration-worn parts of an electric utility's turbine-generator unit requires the unit to be taken off-line. Such system downtime is costly to the utility as it must purchase replacement electric power from other utilities. Balancing a rotatable machine means balancing the rotor of the machine. Balancing the rotor in the field after system delivery, and whenever rotor vibrations become a problem, will reduce such vibrations for a smoother running rotor giving the rotating machine a longer and more trouble-free life.

The most common corrective measure taken to balance the machine rotor and reduce rotor vibrations is to add counteracting or corrective balance weights in the field whenever measured rotor vibrations exceed an upper limit. Balancing the machine rotor of large rotating machines, such as turbine-generator units, in this manner can be particularly difficult as the multiple-rotor trains of these units are very sensitive to the mount and location of unbalance forces. Thus, several attempts are typically needed to balance large turbine-generator units using conventional techniques. Each attempt to balance such a machine is very costly to its operator because the unit must be taken off-line during the corrective weight installation procedure.

A conventional method for field balancing a machine rotor of a rotating machine is called influence coefficient balancing. The influence coefficient balancing method typically takes the rotating machine off-line to run a set of experiments to measure the amplitude of the vibrational effect on the machine rotor of adding a single unitary weight at various locations and then makes a calculation to compute the mass to be installed at those locations which would reduce the rotor vibrations based on previous measurements of the rotor vibrations taken when the rotating machine was on-line.

A known proposed method for field balancing a machine rotor (U.S. Pat. No. 4,098,127) mathematically computes the influence coefficients instead of measuring them. The proposed method is based on a mathematical analysis of the shaft system which describes the amplitude of the deflection of the rotor shaft at one axial position in terms of a transfer matrix times the displacement of the rotor shaft at another axial position. Such proposed method is based on an axial-position-varying model of rotor displacement which does not accurately describe system behavior. Also, such proposed method makes single use of its model equations in arriving at fixed influence coefficients and thereafter makes iterative use of those fixed influence coefficients in arriving at balance weights.

Another conventional method is for a field balancing engineer to rely on his or her experience to achieve an acceptable total mass for the balance weights. However, such a method requires the rotating machine to be taken off-line to determine such weights, and such method does not always minimize rotor vibrations.

There is needed an improved method for field balancing a machine rotor of a rotating machine, such as a turbine-generator unit, which further reduces rotor vibration levels below those levels reached by known techniques.

SUMMARY OF THE INVENTION

It is an object of the invention to provide a model-based method for field balancing a rotatable machine.

The method is for balancing a rotatable machine having a steady-state rotational speed, a generally longitudinally extending rotor, and a generally longitudinal axis. The method includes steps a) through i).

Step a) requires measuring, at the steady-state rotational speed, the vibrational displacement of the rotor of the machine with respect to the axis at a number of first axial locations along the rotor. Step b) requires formulating an equation for a rotordynamic computer model of the machine based on finite element analysis relating, at the steady-state rotational speed, the vibrational displacement of the rotor of the model with respect to the axis, at a number of second axial locations along the rotor, as a time-dependent function of the centrifugal forces applied to the machine by adding an unbalance weight at each of a number of third axial locations along the rotor, wherein each unbalance weight has a mass and an off-axial location, and wherein the second axial locations include the first axial locations and the third axial locations. Step c) requires defining a performance function, in the frequency domain, which includes the sum of the squares of the difference between the vibrational displacement of the rotor of the machine and the vibrational displacement of the rotor of the model at the first axial locations. Step d) requires choosing a value for the mass and the off-axial location for each unbalance weight at the third axial locations. Step e) requires solving the equation of step b) in the frequency domain for the vibrational displacement of the rotor of the model at the second axial locations. Step f) requires calculating the performance function of step c). Step g) requires determining new values for the mass and the off-axial location of each unbalance weight based on a goal of optimizing the performance function. Step h) requires repeating steps e) through g) until the performance function is optimized. Step i) requires adding balance weights to the machine which are the reverse of the unbalance weights when the performance function defined in step c) is optimized.

Several benefits and advantages are derived from the invention. The method describes the dynamics of the rotor at axial locations along the rotor in terms of a time-dependent rotordynamic computer model equation based on a finite element analysis of the machine. Such method inherently describes the amplitude and phase of the deflections of the rotor shaft (instead of only the amplitude, as is done in all prior art methods). The result is a more mathematically accurate method for field balancing a rotatable machine which should result in lower rotor vibration levels than those achieved with known techniques.

BRIEF DESCRIPTION OF THE DRAWINGS

The accompanying drawings help illustrate the present invention wherein.

DETAILED DESCRIPTION OF THE INVENTION

Figure 1:
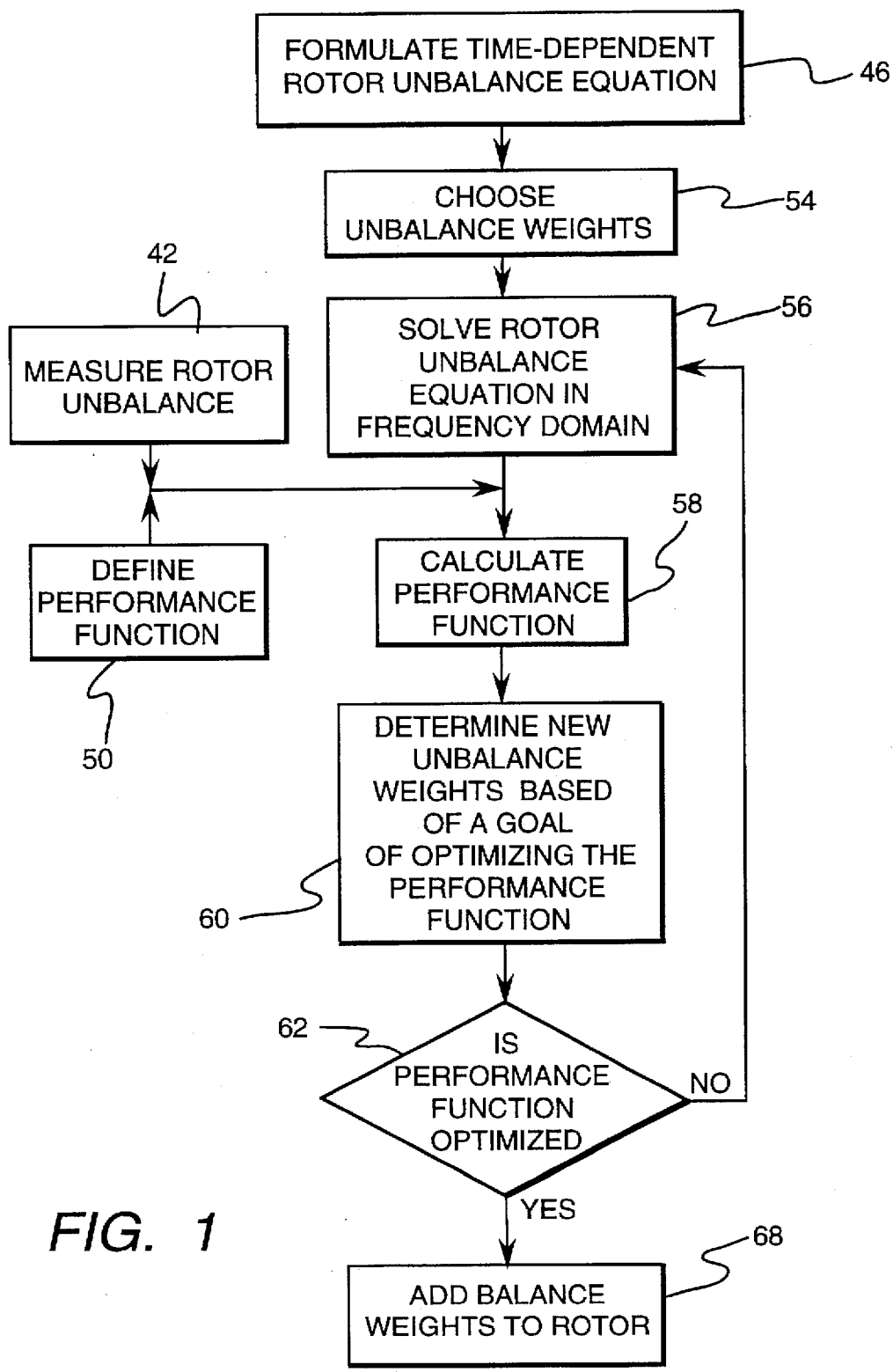
FIG. 1 is a block diagram (flow chart) of a preferred method of the present invention for field balancing a rotatable machine having a rotor.

Referring now to the drawings, FIG. 1 shows in block diagram form a preferred method of the invention for balancing a rotatable machine 10 (partially shown in FIG. 2) having a steady-state rotational speed, a generally longitudinally extending rotor 12, and a generally longitudinal axis 14. The method of the invention may be used for balancing a rotatable machine 10 at any site including in the field, at the factory, or at a repair facility. As previously mentioned, balancing a rotatable machine 10 means balancing the machine's rotor 12.

Figure 2:
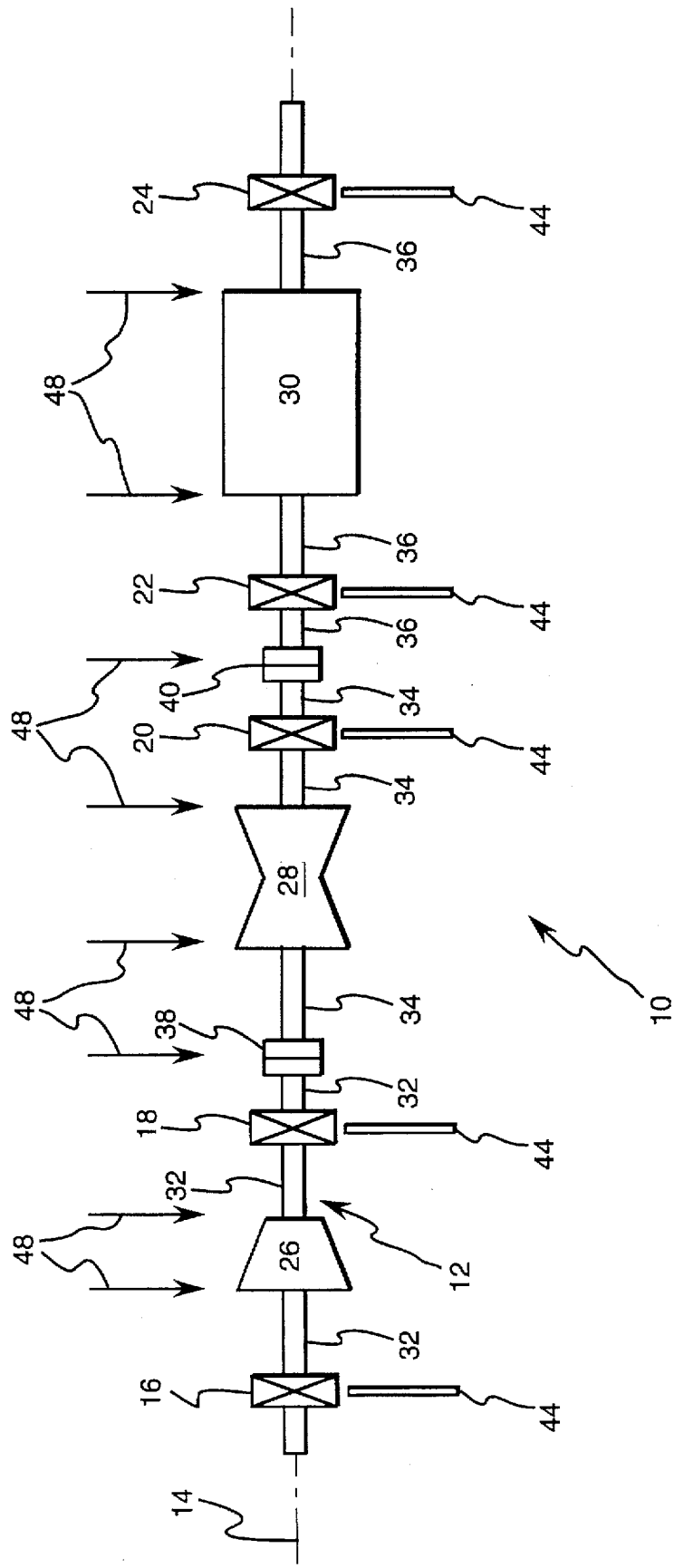
FIG. 2 is a schematic view of a rotor of a turbine-generator unit to be balanced by the method shown in FIG. 1 together with the possible axial locations of the balance weights and the axial locations of the sensors which measure the vibrational displacement of the rotor.

The rotor 12 of FIG. 2 is a seventy-foot long rotor of a steam turbine-generator unit and includes: bearings 16, 18, 20, 22, and 24; high pressure turbine rotor 26; low pressure turbine rotor 28; generator rotor 30, rotor shafts 32, 34, and 36; and shaft couplings 38 and 40.

The preferred method includes steps a) through i).

Step a) is portrayed in block 42 of FIG. 1 as "Measure rotor unbalance". Step a) includes measuring, at the steady-state rotational speed, the vibrational displacement of the rotor 12 of the machine 10 with respect to the axis 14 at a plurality of first axial locations along the rotor 12. In an exemplary embodiment, such plurality of first axial locations is five, and such first axial locations are the axial locations of the bearings 16, 18, 20, 22, and 24. Such displacement may be measured by conventional sensors 44 which may include conventional proximity and/or contact type displacement sensors.

Step b) is portrayed in block 46 of FIG. 1 as "Formulate time-dependent rotor unbalance equation". Step b) includes formulating an equation for a rotordynamic computer model of the machine 10 based on finite element analysis relating, at the steady-state rotational speed, the vibrational displacement of the rotor of the model with respect to the axis 14 at a plurality of second axial locations along the rotor 12 as a time-dependent function of the centrifugal forces applied to the machine 10 by adding an unbalance weight at each of a plurality of third axial locations along the rotor 12, wherein each unbalance weight has a mass and an off-axial location, and wherein the second axial locations include the first axial locations and the third axial locations. Some equipment manufacturers have developed rotordynamic computer models of rotatable machines based on finite element analysis, and such models may be adapted to yield such equation, as is within the purview of one of ordinary skill in the art. For example, the publicly available EPRI-GE (Electric Power Research Institute—General Electric Company) rotor dynamics code (available to EPRI members which include major U.S. electric power equipment manufacturers) may be used which describes a rotatable machine 10 in terms of its properties, including its geometric, weight, inertia, bearing and pedestal properties. In an exemplary model, the plurality of second axial locations is one hundred fifty-four, the second axial locations are otherwise arbitrarily determined using finite element analysis techniques, the plurality of third axial locations is eight, and the third axial locations are the axial middle of the shaft couplings 38 and 40 and the axial ends of the high pressure turbine rotor 26, the low pressure turbine rotor 28, and the generator rotor 30. The third axial locations are the conventional locations where balance weights can be added to the rotor 12 of the rotatable machine 10 and are pointed to by arrows marked 48 in FIG. 2. Preferably, step b) includes the step of formulating the equation in terms which include the vibrational displacement of the rotor of the model and its first and second time derivatives, and further includes the step of deriving a stiffness matrix which operates on the vibrational displacement of the rotor of the model, a damping matrix which operates on the first time derivative of the vibrational displacement of the rotor of the model, and a mass matrix which operates on the second time derivative of the vibrational displacement of the rotor of the model.

Step c) is portrayed in block 50 of FIG. 1 as "Define performance function". Step c) includes defining a performance function in the frequency domain which includes (but is not limited to) the sum of the squares of the difference between the vibrational displacement of the rotor 12 of the machine 10 and the vibrational displacement of the rotor of the model at the first axial locations.

Step d) is portrayed in block 54 of FIG. 1 as "Choose unbalance weights". Step d) includes choosing a value for the mass and the off-axial location for each unbalance weight at the third axial locations. Such initial values are arbitrary. Obviously, the artisan would choose small values for the mass of the unbalance weights, and a zero mass may be initially chosen for one or more of the third axial locations.

Step e) is portrayed in block 56 of FIG. 1 as "Solve rotor unbalance equation in frequency domain". Step e) includes solving the time-dependent equation of step b) in the frequency domain for the vibrational displacement of the rotor of the model at the second axial locations. Preferably, step e) includes the step of solving the equation of step b) for the vibrational displacement of the rotor of the model (such rotor turning at the previously mentioned steady-state rotational speed) in terms which include a complex number representing an amplitude and representing a phase relative to a reference mark. With the machine and model vibrational displacements represented as complex numbers, the performance function of step c) would include the sum of the squares of the difference between the real parts of such complex numbers plus the sum of the squares of the difference between the imaginary parts of such complex numbers. In an exemplary method, step e) includes the steps of deriving a system matrix based on the stiffness, damping, and mass matrices and then inverting the system matrix. The inverse of the system matrix is stored in order to avoid having to completely rerun the entire analysis for each later iteration, since the system matrix is a time-constant matrix, as can be appreciated by those skilled in the art.

Step f) is portrayed in block 58 of FIG. 1 as "Calculate performance function". Step 1D includes calculating the performance function defined in step c). Preferably, step f) includes the step of translating the measurements of step a), if required, such that the machine rotor displacements are expressed in the frequency domain.

Step g) is portrayed in block 60 of FIG. 1 as "Determine new unbalance weights based on a goal of optimizing the performance function". Step g) includes determining new values for the mass and the off-axial location of each unbalance weight based on a goal of optimizing the performance function defined in step c). Preferably, step g) includes the step of computing the first and second gradients of the performance function, defined in step c), with respect to the mass and the off-axial location of each unbalance weight using sensitivity analysis closed form formulas, as is within the purview of those skilled in the art. The sensitivity analysis provides more accurate results in less computation time than do methods which use finite difference techniques.

Step h) is portrayed in block 62 of FIG. 1 as "Is performance function optimized" with an arrow leading back to step f) (block 56) for a "no" response. Step h) includes repeating steps e) through g) until the performance function defined in step c) is optimized. It is noted that steps e) through h) (blocks 56, 58, 60 and 62 in FIG. 1) may be computed using a publicly available optimizer computer program (such as, but not limited to, NEWSUMT which is public domain software available from Virginia Tech, which is used for the solution of nonlinear unconstrained function minimization problems, and which employs a sequence of unconstrained minimizations using Newton's method). It is noted that such optimizer program automatically determines new unbalance weights based on a goal of optimizing the performance function.

Step i) is portrayed in FIG. 1 in block 68 as "Add balance weights to rotor". Step i) includes adding balance weights to the machine 10 which are the reverse of the unbalance weights when the performance function defined in step c) is optimized. It is noted that the balance weights are added to the rotor 12 of the machine 10 which are the reverse of the unbalance weights added to the rotor of the model which allowed the performance function defined in step c) to be optimized, wherein the model essentially duplicated the unbalance behavior of the machine 10 as measured at the plurality of first axial locations along the rotor 12.

Should the method of the invention call for unacceptably-heavy balance weights, a weighting term can be added to the performance function defined in step c), such weighting term being equal to the sum of the squares of the product of a weighting coefficient and the unbalance weight at each of the plurality of third axial locations. Preferably, the initial value of each weighting coefficient is unity (i.e., the number "1"). If the method of the invention is performed and still calls for unacceptably-heavy balance weights, then, new values of the weighting coefficients are chosen and the steps of the method of the invention repeated until rotor vibrations are minimized with balance weights of acceptable mass. Preferably, equal values are chosen for each weighting coefficient, and the new values of the weighting coefficients are chosen by adding an equal prechosen fixed increment (e.g., any small arbitrary amount) to the previous values for the weighting coefficients.

In one example, a steam turbine-generator unit similar to that shown in FIG. 2 was chosen for the rotatable machine 10 with vibrations being measured or predicted from left to right at the five axial locations corresponding to the bearings 16, 18, 20, 22 and 24 and with permissible balance weight axial locations being given from left to right corresponding to the arrows 48. Vibration levels are peak-to-peak vibration levels expressed in mils, and balance weights are given as weight/phase in units of ounces/degrees with a zero balance weight given simply as 0 without any phase. The original measured machine rotor vibrations at the bearing locations were 0.4, 2.1, 3.6, 0.5 and 1.2. Computer simulations for rotor balancing using the method of the invention (with the weighting term used in the performance function) predicted vibrations of 0.6, 1.5, 1.5, 0.5 and 0.9 for balance weights of 8/262, 0, 0, 12/250, 5/95, 0, 0 and 0. Computer simulations for rotor balancing using an influence coefficient method predicted zero vibrations at each bearing location for balance weights of 183/147, 183/327, 89/148, 156/221, 192/181, 46/334, 52/189 and 38/188. A balancing engineer was able to reach actual measured vibrations of 0.7, 1.7, 1.8, 1.0 and 1.2 by using balance weights of 0, 0, 0, 7/255, 14/30, 0, 0 and 0. It is seen that the method of the invention predicted acceptable vibration levels (under 2.0 at each bearing) with a total mass corresponding to 25 ounces for the balance weights. The influence coefficient method predicted zero vibration but at an unacceptable total balance weight of 939 ounces (over 58 pounds). This is not surprising since the influence coefficient balancing method can call for weights which would counteract each other to some degree to reduce rotor vibration. The balancing engineer used only 21 ounces for balancing weights but did not achieve vibration levels as low as those predicted using the method of the invention.

As can be appreciated from the foregoing description, a method for balancing (e.g., field balancing) a rotor of a rotatable machine such as a steam turbine-generator unit has been disclosed wherein: a time-dependent equation is formulated for rotor vibration based on a rotordynamic computer model derived from finite element analysis of the machine's rotor vibration due to centrifugal forces caused by adding unbalance weights; the equation is repeatedly solved in the frequency domain as an optimizer program uses iteration to determine the unbalance weights which will cause the vibration of the rotor of the model to duplicate the measured vibration of the rotor of the machine without excessive mass being called for in the unbalance weights; and then balance weights are added to the rotor of the machine which are the inverse of the unbalance weights which were added to the rotor of the model.

An example will now be given to mathematically illustrate some of the steps of the invention.

Define an x-y-z Cartesian coordinate system such that the z-axis coincides with the stationary longitudinal axis 14 of the rotor 12 when the rotor 12 is at rest. The location of a point can be represented in this coordinate system as having a component along the z axis (i.e., the stationary longitudinal axis 14) and a component along each of the x and y axes (i.e., the x-axis and y-axis components together represent the off-axial [i.e., off-z-axis or off-stationary-longitudinal-axis-14] location of the point).

In step a), let "$u_i(t)$" be a time-varying vector having an x-axis component & a y-axis component and representing the vibrational displacement measured by the "i"th sensor 44 of the steady-state rotating surface of the machine rotor 12 from the position of the surface of the machine rotor 12 measured by the "i"th sensor when the machine rotor 12 is at rest. "$u_1(t)$" represents the vibrational displacement measured by the first sensor 44, "$u_2(t)$" represents the vibrational displacement measured by the second sensor 44, etc. There is one sensor 44 for each of the plurality of first axial locations. Let "$\{u(t)\}$" be a time-varying vector whose first row represents the x-axis component of "$u_1(t)$", whose second row represents the y-axis component of "$u_1(t)$", whose third row represents the x-axis component of "$u_2(t)$", whose fourth row represents the y-axis component of "$u_2(t)$", . . . whose next-to-last row represents the x-axis component of last "$u_i(t)$", and whose last row represents the y-axis component of the last "$u_i(t)$".

In step b), let "$U_j(t)$" be a time-varying vector having an x-axis component & a y-axis component and representing the maximum vibrational displacement at the "j"th axial location of a model rotor, such model being based on a finite element analysis model of the machine rotor 12. There is a "$U_j(t)$" for each of the plurality of second axial locations. Let "$U_1(t)$" and "$U_2(t)$" represent the two ends of the first Timoshenko finite-element beam element, "$U_2(t)$" and "$U_3(t)$" represent the ends of the second Timoshenko finite-element beam element, etc. Also, let "$\{U(t)\}$" be a time-varying vector representing all the "$U_j(t)$'s" in the same manner as the previously-described "$u(t)$" time-varying vector represents all of the "$u_i(t)$'s". Also in step b), let "$F_k(t)$" be a time-varying vector having an x-axis component and a y-axis component and representing the centrifugal force applied by adding an unbalance weight at the "k"th axial location. There is an "$F_k(t)$" for each of the plurality of third axial locations. Let "$\{F(t)\}$" be a vector representing all the "$F_k(t)$'s" in the same manner as the previously-described "$u(t)$" vector represents all of the "$u_i(t)$'s". The equation in step b) would then be given by:

$$[M]\{\ddot{U}(t)\}+[C]\{\dot{U}(t)\}+[K]\{U(t)\}=\{F(t)\}$$

where the double-dot over the first $\{U(t)\}$ term means the second time derivative, the single-dot over the second $\{U(t)\}$ term means the first time derivative,

[M] is the system mass matrix made up of (four row by four column) submatrices [m] which operate only on "$U_j(t)$" and "$U_{j+1}(t)$" (i.e., the two ends of the beam element),

[C] is the system damping matrix made up of (four row by four column) submatrices [c] which operate only on "$U_j(t)$" and "$U_{j+1}(t)$") (i.e., the two ends of the beam element), and

[K] is the system stiffness matrix made up of (four row by four column) submatrices [k] which operate only on "$U_j(t)$" and "$U_{j+1}(t)$" (i.e., the two ends of the beam element), where:

$$[k]=\frac{EI}{L(L^2+12B)}\begin{bmatrix} 12 & 6L & -12 & 6L \\ 6L & (4L^2+12B) & -6L & (2L^2-12B) \\ -12 & -6L & 12 & -6L \\ 6L & (2L^2-12B) & -6L & (4L^2+12B) \end{bmatrix}$$

with:

B=EI/GSA,

L=length of beam element,

E=Young's modulus of beam element,

G=shear modulus of beam element

S=shear factor of beam element,

A=area of beam element, and

I=moment of inertia of beam element.

where:

$$[m]=RA[W^{-T}][H][W^{-1}]$$

with

R=mass density of beam element, $[W^{-1}]$ is the inverse of the [W] matrix, and $[W^{-T}]$ is the transpose of the $[W^{-1}]$ matrix, where:

$$[W]=\begin{bmatrix} 0 & 0 & 0 & 1 \\ B & 0 & 1 & 0 \\ L^3/6 & L^2/2 & L & 1 \\ (L^2/2+B) & L & 1 & 0 \end{bmatrix}$$

and $$[H]=\begin{bmatrix} H_{11} & H_{12} & H_{13} & H_{14} \\ H_{21} & H_{22} & H_{23} & H_{24} \\ H_{31} & H_{32} & H_{33} & H_{34} \\ H_{41} & H_{42} & H_{43} & H_{44} \end{bmatrix}$$

where:

$H_{11}=L^7/252+D(L^5 20+L^3 B/3+LB)$, $H_{21}=H_{12}=L^6/72+D(L^4/8+L^2 B/2)$, $H_{22}=L^5 20+DL^2/3$, $H_{31}=H_{13}=L^5 30+D(L^3/6+L)$, $H_{32}=H_{23}=L^4/8+DL^2 2+L^3/3+DL$, $H_{33}=0$, $H_{41}=H_{14}=L^4 24$, $H_{42}=H_{24}L^3/6$, $H_{43}=H_{34}L^2/2$, $H_{44}=L$, and $D=I/A$, and where:

$$[c]=f_1[k]+f_2[m],$$

with $f_1$ and $f_2$ being constants determined by the artisan from experiments and/or computer simulations.

Turning our attention now to step c), let:

$$\{u(t)\}=[\{u_{real}\}+i\{u_{imag}\}]e^{iwt}, \text{ and}$$

$$\{U(t)\}=[\{U_{real}\}+i\{U_{imag}\}]e^{iwt},$$

where, for example, $\{u_{real}\}$ and $\{u_{imag}\}$ are the real and imaginary components of $\{u(t)\}$, i is the square root of minus one, w is the steady-state rotational speed of the rotor 12, t is time, and $e^{iwt}$ represents the time harmonic. It is noted that $\{u(t)\}$ is thus represented as a complex number having a real-axis component equal to $\{u_{real}\}$, an imaginary-axis component equal to $\{u_{imag}\}$, an amplitude equal to $(u_{real}^2+u_{imag}^2)^{1/2}$, and a phase equal to $\arctan(u_{imag}/u_{real})$, where the phase is relative to a reference mark which is the real axis.

The performance function (herein referred to as "P") in step c), expressed in the frequency domain, would then be given (for example) by:

$$P = \sum_{i=1}^{T} (U_{i_{real}} - u_{i_{real}})^2 + (U_{i_{imag}} - u_{i_{imag}})^2$$

where T is the plurality of first axial locations.

Let $\{F(t)\} = [\{F_{real}\} + i\{F_{imag}\}]e^{iwt}$

Then, the equation in step b) would be written in the frequency domain as:

$$[S] = \left\{ \begin{array}{c} U_{real} \\ U_{imag} \end{array} \right\} = \left\{ \begin{array}{c} F_{real} \\ F_{imag} \end{array} \right\}$$

where:
[S] is the system matrix, wherein $$S = \left[ \begin{array}{cc} (-Mw^2 + K) & -Cw \\ +Cw & (-Mw^2 + K) \end{array} \right]$$

It is noted that [S] is constant, and that one may write:

$$\left\{ \begin{array}{c} U_{real} \\ U_{imag} \end{array} \right\} = [S^{-1}] \left\{ \begin{array}{c} F_{real} \\ F_{imag} \end{array} \right\}$$

It is further noted that publicly available optimizer computer programs typically require gradients (i.e., partial derivatives) of the performance function P with respect to the displacement U, and that this results in the product of the constant matrix $[S^{-1}]$ and the gradient of the F vector with respect to the U vector. As can be appreciated by the artisan, the solution time is considerably shortened (and made practical) only because of the method of the invention which has cast the performance function such that [S] is constant.

The foregoing description of several preferred methods of the invention has been presented for purposes of illustration. It is not intended to be exhaustive or to limit the invention to the precise methods disclosed, and obviously many modifications and variations are possible in light of the above teaching. For example, the rotatable machine 10 is not limited to a turbine-generator unit, and may be any rotatable machine including, but not limited to, a turbine, generator, motor, pump and/or fan. Also, the method of the invention is not limited, at any first axial location, to a vibration measurement and computation along a single radial direction, but such method equally applies, at such first axial location, to vibration measurements and computations along multiple radial directions, such as along two radial directions ninety degrees apart. It is intended that the scope of the invention be defined by the claims appended hereto.

We claim:

1. A method for balancing a rotatable machine having a steady-state rotational speed, a generally longitudinally extending rotor, and a generally longitudinal axis, the method comprising the steps of:

a) measuring at said steady-state rotational speed the vibrational displacement of said rotor of said machine with respect to said axis at a plurality of first axial locations along said rotor;

b) formulating an equation for a rotordynamic computer model of said machine based on finite element analysis relating at said steady-state rotational speed the vibrational displacement of said rotor of said model with respect to said axis at a plurality of second axial locations along said rotor as a time-dependent function of the centrifugal forces applied to said machine by adding an unbalance weight at each of a plurality of third axial locations along said rotor, wherein each said unbalance weight has a mass and an off-axial location, and wherein said plurality of second axial locations includes said plurality of first axial locations and said plurality of third axial locations;

c) defining a performance function in the frequency domain which includes the sum of the squares of the difference between the vibrational displacement of said rotor of said machine and the vibrational displacement of said rotor of said model at said plurality of first axial locations;

d) choosing a value for the mass and the off-axial location for each said unbalance weight at said plurality of third axial locations;

e) solving said equation in the frequency domain for the vibrational displacement of said rotor of said model at said plurality of second axial locations;

f) calculating said performance function;

g) determining new values for the mass and the off-axial location of each said unbalance weight based on a goal of optimizing said performance function;

h) repeating steps e) through g) until said performance function is optimized; and i) adding balance weights to said machine which are the reverse of said unbalance weights when said performance function is optimized, wherein step b) includes the step of formulating said equation in terms which include the vibrational displacement of said rotor of said model and its first and second time derivatives, and wherein step b) includes the step of deriving a stiffness matrix which operates on the vibrational displacement of said rotor of said model, a damping matrix which operates on the first time derivative of the vibrational displacement of said rotor of said model, and a mass matrix which operates on the second time derivative of the vibrational displacement of said rotor of said model.

2. The method of claim 1, wherein step e) includes the steps of deriving a system matrix based on said stiffness, damping, and mass matrices.

3. The method of claim 1, wherein step e) includes the step of solving said equation for the vibrational displacement of said rotor of said model in terms which include a complex number representing an amplitude and representing a phase relative to a reference mark.

* * * * *